US008856186B1

(12) United States Patent
Li et al.

(10) Patent No.: US 8,856,186 B1
(45) Date of Patent: Oct. 7, 2014

(54) OBJECT GROUPING FOR GARBAGE COLLECTING

(75) Inventors: Peng Li, Seattle, WA (US); Dominic Cooney, Tokyo (JP)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/172,712

(22) Filed: Jun. 29, 2011

(51) Int. Cl.
*G06F 7/00* (2006.01)
*G06F 17/00* (2006.01)
*G06F 17/30* (2006.01)

(52) U.S. Cl.
CPC .............................. *G06F 17/30351* (2013.01)
USPC ........................... 707/800; 707/811; 707/813

(58) Field of Classification Search
CPC .................... G06F 17/30082; G06F 17/30073; G06F 17/30076; G06F 17/30091; G06F 17/30174; G06F 17/30221; G06F 17/30557; G06F 17/30581; G06F 17/30896
USPC .................. 707/200, 203, 206, 100; 711/170; 717/128, 130, 141; 709/205; 345/440; 715/848, 764; 710/3; 705/28; 375/150; 706/50
See application file for complete search history.

(56) References Cited

U.S. PATENT DOCUMENTS

| | | | | |
|---|---|---|---|---|
| 6,965,634 | B1 * | 11/2005 | Clark | 375/150 |
| 7,730,465 | B2 * | 6/2010 | Sutter et al. | 717/141 |
| 2006/0101032 | A1 * | 5/2006 | Sutter et al. | 707/100 |
| 2006/0161603 | A1 * | 7/2006 | Barrs et al. | 707/203 |
| 2006/0161751 | A1 * | 7/2006 | Barrs et al. | 711/170 |
| 2006/0173939 | A1 * | 8/2006 | Yin et al. | 707/206 |
| 2006/0253498 | A1 * | 11/2006 | Barrs et al. | 707/200 |
| 2008/0270339 | A1 * | 10/2008 | Copeland et al. | 706/50 |
| 2009/0006506 | A1 * | 1/2009 | DiFlora | 707/206 |

OTHER PUBLICATIONS

B. Venners, JavaWorld, Aug. 1, 1996, "Java's Garbage-Collected Heap—An Introduction to the Garbage-Collected <br> Heap of the Java Virtual Machine," JavaWorld Solutions for Java Developers, http://www.javaworld.com/javaworld/jw-08-1996/jw-08-gc.html, 7 pages.

* cited by examiner

*Primary Examiner* — Susan Chen
(74) *Attorney, Agent, or Firm* — Sterne, Kessler, Goldstein & Fox P.L.L.C.

(57) ABSTRACT

Methods, systems, and computer program products for memory garbage collection via object grouping are disclosed. Normative objects are allocated in a non-native memory referencing respective one or more native objects in a native memory. The non-native objects are grouped into non-native object groups based upon information regarding object references associated with respective ones of the native objects. Objects in respective ones of the one or more non-native object groups are provided one or more references to other said objects of the non-native object groups to create connected object groups. Unused ones of the connected object groups are detected. And objects of the detected unused ones of the connected object groups are de-allocated.

17 Claims, 7 Drawing Sheets

OBJECT GROUPING FOR GARBAGE COLLECTING

BACKGROUND

1. Field

This disclosure generally relates to garbage collecting of objects from memory.

2. Background Art

Garbage collection, as used herein, is a form of memory management. A garbage collector will seek to collect and remove objects or other data structures that are stored in memory but are no longer being used. Garbage collection can occur at any time during system processing, but may also be configured to activate when the memory consumption has reached or is nearing capacity or another configured threshold. In many processing environments, many of the objects, variables and other data that are created or used during the execution of a program are stored in an area of memory known as the heap. As the heap fills up or reaches capacity, a garbage collector may be configured to clear the unused objects from the heap, so that the system can use the available memory for further allocations.

Conventional garbage collection schemes work by maintaining a root set of objects from which all objects that are currently in use are reachable. Whether or not an object is reachable from a node in the root set is determined by keeping track of the references among active objects. At the time of garbage collection, any objects that are not reachable from the root set are considered unused and may be de-allocated. The conventional garbage collection schemes may work adequately when all of the objects are from the same processing environment, because then the interdependencies between objects can be accurately determined. However, conventional garbage collection schemes cannot effectively determine which objects are to be cleared from a heap (e.g., are unused), when one or more of those objects correspond to or references one or more objects in another processing environment. As such, when objects in a first processing environment reference objects in a second processing environment, conventional garbage collection schemes may result in unused objects remaining in the heap or other memory portion even after garbage collection.

Leaving unused objects or other data structures within a heap, as may be done by conventional schemes, is referred to as a memory leak. These memory leaks may, over time, cause more and more of the memory accessible to an operating program to be consumed by unused objects, which may eventually cause the system to run out of memory for new objects necessary for continued execution of the system.

SUMMARY OF THE EMBODIMENTS

Methods, systems, and computer program products for memory garbage collection via object grouping are disclosed. Non-native objects are allocated in a non-native memory referencing respective one or more native objects in a native memory. The non-native objects are grouped into non-native object groups based upon information regarding object references associated with respective ones of the native objects. Objects in respective ones of the one or more non-native object groups are provided one or more references to other said objects of the non-native object groups to create connected object groups. Unused ones of the connected object groups are detected. And objects of the detected unused ones of the connected object groups are de-allocated.

Further features and advantages of the embodiments, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

Figure 1:
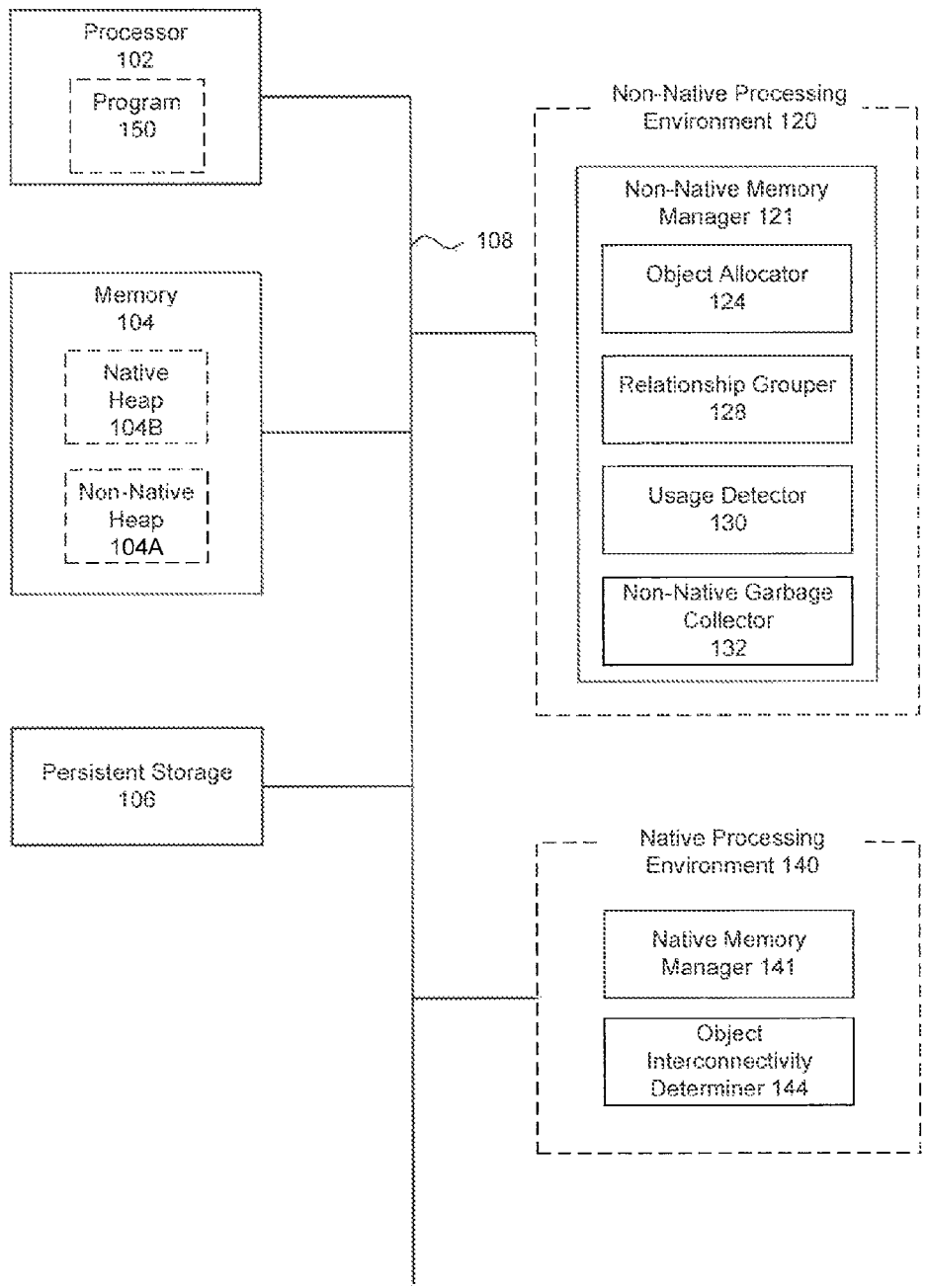
FIG. 1 illustrates a system for garbage collecting through object grouping.

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Embodiments disclosed herein can be used to perform garbage collection of memory using object grouping, particularly where objects in a first execution environment are referenced by objects in a second execution environment. Garbage collection of objects in a non-native memory is performed where the objects in the non-native memory reference objects in a native memory. The term "non-native memory" is used herein to refer to the memory available to a processing environment that is not the native processing environments of the system. For example, the non-native memory may be the memory area used by an embedded execution environment. Processes or threads executing in the embedded processing environment allocate memory objects in the non-native memory. The term "native memory" is used herein to refer to the memory that is not available to the embedded processing environment, but which is available to the native processing environment. The non-native memory may be a portion of a native memory.

According to one or more exemplary embodiments, garbage collection of objects in a non-native execution environment such as a Java Virtual Machine (JVM) is performed, where JAVA objects are allocated in a heap in the non-native memory in these exemplary embodiments, the non-native memory is allocated from a native memory which includes an area to allocate objects and other data structures, such as C/C++ data structures, for the native execution environment. Objects may be garbage collected from memory when both non-native and native objects are stored in one or more memory portions (e.g., heaps) and one or more non-native objects are created as proxies or wrappers to correspond or point to the one or more native objects. A program may instantiate, create or otherwise use both non-native and native objects during its execution. These objects may be allocated in heap portions of memory.

When executing the program, non-native objects may be created and allocated in portions of a non-native heap. Similarly, native objects may be created and allocated in portions of a native heap. However, often when native objects are created or otherwise used or referenced by the program, a corresponding non-native object that refers to or otherwise represents the native object within the non-native environment may be created within the non-native heap, herein referred to as a wrapper object. The wrapper object may operate as proxy, whereby when the program is executing and uses a native object, the wrapper object may point to the native object required by the program. For example, in JAVA, a wrapper object may be created that points to, refers to, or otherwise references a native object that is created or otherwise used by an executing program As the program executes, more and more non-native objects and non-native wrapper objects (that correspond to one or more native objects) may be created and allocated in the non-native heap. Then, for example, as the available space remaining in the heap is allocated in more and more non-native objects, a non-native garbage collector may be executed to clear the unused objects (including wrapper objects) from the non-native heap. A non-native memory manager may effectively track relationships and usage of non-native objects stored in the non-native heap, which can be provided to (or in other embodiments collected by) a non-native memory garbage collector which may then clear the unused (non-wrapper) non-native objects from the non-native heap. However, conventional non-native memory managers may be unable to correctly garbage collect the non-native wrapper objects that may exist in the non-native heap.

Conventional non-native memory managers may fail in correctly garbage collecting the non-native wrapper objects because they may be unable to track the relationships or usage among the native objects, which are allocated in the native memory heap and cannot therefore be accessed directly by the non-native memory managers. Conventional non-native memory managers may be unable to determine the relationships amongst the non-native wrapper objects because such non-native wrapper objects may or may not be related via their corresponding native objects in the native heap. Therefore, the non-native garbage collector cannot effectively garbage collect all the unused non-native (wrapper) objects of the non-native heap.

While there have been proposed solutions to address this memory leak issue in conventional memory management schemes, these proposed solutions result in less-than-ideal scenarios. One such proposed solution is to use weak references which may allow non-native objects to keep native objects alive (to the garbage collector) but not the other way around. However, as just noted, the weak references do not allow a garbage collector to trace through a native heap which prevents effective garbage collection of native objects. Another proposed solution is to create new objects at garbage collection time which attempt to track the relationship between non-native and native objects. This solution however requires allocation of new memory for new objects at or around garbage collection time, which can create problems such as memory allocation problems because it is being performed at a time when a heap is full and/or is nearing capacity.

FIG. 1 illustrates a system 100 for garbage collecting through object grouping. The system 100, as referenced above, may allow a non-native garbage collector to garbage collect non-native objects from a non-native heap, including non-native wrapper objects that may correspond to native objects that may exist on a native heap. The system 100 may allow a non-native garbage collector to overcome the memory leak problem associated with conventional non-native memory management systems and the limitations of previously proposed solutions as described above.

The system 100 may allocate a field, or other data-holding portion of memory to be associated with each wrapper object, that may be created or otherwise used to point to or otherwise reference one or more native objects. The field, herein referred to as a tracking field, may be used to define relationships amongst the non-native wrapper objects that represent the relationships that may exist amongst the corresponding native objects (to which the non-native wrapper objects refer). For example prior to garbage collection of the non-native heap (where non-native objects and non-native wrapper objects may be stored), and preferably immediately prior to the garbage collection of the non-native heap, the native objects of the native heap may be traversed. The system 100 may determine, based on the traversal of the native heap (and/or objects stored thereon), the interconnectivity, relationships and/or usage of the native objects. The system 100 may then provide values into the previously allocated tracking fields (of the non-native wrapper objects) that represent or otherwise correspond to the relationships amongst the corresponding native objects, creating one or more object groupings. Then, a non-native garbage collector, upon determining which objects of the non-native heap are being unused, may effectively garbage collect the unused non-native wrapper objects based on the object groupings, whereby all of the wrapper objects of an object grouping that are being unused will be garbage collected.

An unused object, as referred to herein, may include an object in a heap which is not referenced by, does not reference another and/or is not accessible by any other object. For example, a program may create objects A, B, C, and D, whereby only A calls B, only B calls C and only A calls D. Then for example, if it is found that object A has been garbage collected or is no longer being used, then objects B, C and D may be considered unused objects as well and should be garbage collected when A is garbage collected. If however, one or more of these objects are non-native wrapper objects that correspond to native objects that exist in a native heap, then in conventional schemes, as discussed above, a conventional non-native garbage collector may have no way of determining which of the objects are unused and/or should be garbage collected.

The system 100 however, prior to garbage collection time, may group or otherwise provide the relationships that exist amongst the (wrapper) objects A, B, C and D, as they correspond to native objects, by providing values into the tracking fields associated with the wrapper object. Then, for example, when A is determined to be unused and is garbage collected, a non-native garbage collector, based on the tracking field or other reference to the object groupings, may garbage collect all the objects of the group (e.g., B, C and D). The system 100, without requiring the allocation of any additional memory at or around garbage collection time when available memory is running low, may effectively garbage collect (e.g., free up memory allocated to unused objects as they exist in) the heaps, without modifying a legacy or conventional non-native garbage collector.

The system 100 of FIG. 1 may include a processor 102 which may include any computer or electronic processor for executing and/or processing information. The processor 102 may include or be part of any device capable of processing any sequence of instructions. The processor 102 may include, for example, a computer processor, a processor in a mobile device or other electronic and/or digital processor. Processor 102 may, for example, be included in a computer, a mobile computing device, a set-top box, an entertainment platform, a server, a server farm, a cloud computer and the like. The processor 102 may be connected to a memory 104 via a bus 108.

The memory 104 may include volatile memory, virtual and/or other memory, configured to store information for use by and/or output by the system 100. The memory 104 may include, for example, random access memory (RAM) and/or dynamic RAM (DRAM). The memory 104 may be used to store any information, such as state and/or other program information of the system 100.

According to an example embodiment, the memory 104 may be used or otherwise logically and/or physically divided into one or more memories, memory segments or memory portions referred to as heaps (104A, 104B). The heaps 104A, 104B may include portions of memory available to a program 150 for dynamic memory allocation during the program's execution. For example, the non-native heap 104A and the native heap 104B may be used by a program to store non-native and native objects and data, respectively. The memory partition as shown in FIG. 1 is exemplary only and in other embodiments the memory 104 may be partitioned into more or fewer heaps (104A, B) or not partitioned at all. In other example embodiments, there may multiple memories 104. The memory 104, including the heaps 104A, 104B may be garbage collected by one or more garbage collectors.

The bus 108 may include a communication infrastructure that allows interaction between the various components of the system 100. The bus 108 may, for example, carry data between the components of the system 100, such as between the processor 102 and the memory 104. The bus 108 may include a wireless and/or wired communications medium between the components of system 100, and may include parallel, serial or other topological arrangements.

A persistent storage 106 may include non-volatile main memory as used by processor 102 in the system 100. Persistent storage 106 may include, for example, computer readable media such as flash memory, a hard disk or optical disk. Persistent storage 106 may be used, for example, to store instructions of program 10.

The system 100 may include a program 150. The program 150 may be executed by the one or more processors (102) (the code and/or instructions of the program 150 as executed by the processor 102 may reside on one or more memories 104 and/or persistent storage 106, and/or may be distributed over one or more networks and reside on one or more devices). The program 150 may be written in or otherwise comprise code and/or instructions associated with two or more program environments, including, for example, a non-native processing environment (non-native PE) 120 and a native processing environment (native PE) 140. The program 150 may use one or more application programming interfaces (APIs) to interact with one or more of the processing environments 120, 140.

The processing environments 120, 140 may include any set of processes, tools and/or other resources used to create and/ or otherwise used by the program 150. The processing environments 120, 140 may include one or more virtual machines. For example, the non-native PE 120 may include a Java development, programming, or processing environment, and then by contrast, the native PE 140 may include any other environment that is not Java, including, but not limited to a C or C++ environment. In other embodiments, this may be reversed, where C/C++ may be considered non-native, and Java considered native. In another example embodiment, the native PE 140 may be a different version of the programming language associated with the non-native PE 120. The system 100 may include at least one non-native PE 120 and at least one native PE 140, though other embodiments may include more than one non-native and/or native PE 120, 140.

As the program 150 executes, a non-native memory manager (non-native MM) 121 and a native memory manager (native MM) 141 may manage the objects as created and/or instantiated by the program 150 in the non-native and native heaps 104A and 104B, respectively. For example, if the program 150 calls for the instantiation of a Java (non-native) object, this non-native object may be managed by the non-native MM 121 and stored in the non-native heap 104A. Whereby any non-Java (e.g., native) object may be handled by the native MM 150 and stored in the native heap 104B. As referenced above however, the creation and/or other use of one or more of these native objects may cause the non-native MM 121 to populate the non-native heap 104A with a non-native wrapper object corresponding to one or more native objects in the native heap 104B.

The non-native MM 121 may be configured to manage the non-native heap 104A. The non-native MM 121 may include any number of functional blocks associated with compiling, executing and/or otherwise supporting the execution of at least a portion of the program 150, including managing the memory heap 104A. The non-native MM 121 may include, for example, a virtual machine, such as a java virtual machine (JVM). The JVM (121) may then manage or track objects that are created and/or being used in one or more corresponding Java heaps 104A.

The native MM 141 may include functionality similar to that of the non-native MM 121 as just described, except as applied to the native PE 140. Whereby, the native MM 141 may support the program 150 execution and manage native objects stored and/or need to be created in the native heap 104B. For example, if the non-native MM 121 manages Java objects, then the native MM 141 may manage any non-Java objects, including but not limited to C and/or C++ objects.

The non-native MM 121 may include an object allocator 124. The object allocator 124 may allocate portions of the memory 104 (e.g., non-native heap 104A) as required or to be used by the program 150. For example, as just referenced, if the program 150 calls for the instantiation of a non-native object, then the object allocator 124 may reserve that portion of the non-native heap 104A to be used to store the non-native object. If the program 150 calls for a native object, then the object allocator 124 may allocate a corresponding non-native-wrapper object to the non-native heap 104A. The term "object", is used herein to reference an exemplary usage of the system 100 in managing the memory 104. Though the term "object" is commonly associated with object-oriented programming, one skilled in the art will recognize that the system 100 may manage the memory 104 with other forms of memory usage in other kinds of programming, operating and/or execution environments (including, but not limited to, objects in an object-oriented processing environment). For example, the system 100 may be used to manage memory allocation (e.g., perform garbage collection) to store any data or variables.

The program 150 may execute for some period of time, whereby non-native objects (including wrapper objects) that are instantiated or otherwise created reside on the non-native heap 104A and native objects reside on the native heap 104B (for which one or more corresponding non-native wrapper objects may reside on the non-native heap 104A). Then for example, once the memory 104 (e.g., one or more of the heaps 104A, 104B) exceeds a storage threshold, and/or one or more of the MMs 121, 141 determine that it is time to garbage collect the memory 104, an object interconnectivity determiner (OID) 144 may execute.

The OID 144 may determine interconnectivity between the native objects of the native heap 104B. The OID 144 may, for example, track the usage of native objects called by the program 150. In another example embodiment, the OID 144 may traverse the native objects as stored in the native heap 104B, prior to garbage collection of the memory 104 (e.g., heaps 104A and/or B), and determine dependencies, calls and/or other relationships amongst the native objects. According to an example embodiment, the OID 144 may group or otherwise determine the existing groupings of the native objects of the native heap 104B based on their relationships with each other.

A relationship grouper 128 may translate or otherwise represent the relationships amongst the native objects (as determined by the OID 144) amongst the corresponding non-native wrapper objects on the non-native heap 104A. The non-native heap 104A, as referenced above, may include one or more non-native wrapper objects that point or otherwise refer to one or more corresponding native objects on the native heap 104B. Tze object allocator 124 may include with each non-native wrapper object, on the heap 104A, a tracking field or other portion of memory by which to represent the relationships amongst the non-native wrapper objects. Each wrapper object may include in its object class (definition), one or more tracking fields, for which memory is allocated from the heap 104A, at the time of instantiation or creation of the wrapper object(s) (which may or may not substantially correspond to the instantiation of corresponding native objects). In other embodiments, the tracking field(s) may be later added to and/or associated with the wrapper object(s), prior to garbage collection and/or prior to the heap 104A and/or memory 104 reaching a threshold or other capacity.

The relationship grouper 128 may then use the tracking field of the wrapper objects to define relationships amongst the wrapper objects that mimic or are otherwise consistent with the relationships/interconnectivity amongst the corresponding native objects (as determined by the OID 144). For example, when the program 150 creates (or otherwise references the creation of) native objects, the native MM 141 may receive an instruction to create a native object in the native heap 104B, and the non-native MM 121 may receive an instruction to create a corresponding non-native wrapper object in the non-native heap 104A (the sequence and/or simultaneity of the creation of the native object and the corresponding non-native wrapper object does not matter).

Then, for example, as the program 150 continues to execute, relationships may develop and/or otherwise be defined between and/or amongst the native objects in the native heap 104B. The native MM 141 may receive these instructions and represent or otherwise track this interconnectivity amongst the native objects (e.g., in the native heap 104B). The non-native MM 121 however may not receive these instructions regarding the interconnectivity of the native objects in the native heap 104B. As a result, though the non-native wrapper objects that correspond to the native objects may exist in the heap 104A, without the functionality provided by the relationship grouper 128 (as in conventional schemes) there may be no matching interconnectivity amongst the non-native wrapper objects matching the interconnectivity of the native objects to which the non-native wrapper objects correspond.

As a result, without this interconnectivity between and/or amongst the wrapper objects on the non-native heap 104A being defined, as in conventional (e.g., without relationships defined by the relationship grouper 128) schemes, garbage collectors, when clearing unused objects from the heap 104A, may remove or de-allocate some of the unused wrapper objects but may not clear all of the wrapper objects that may be unused. The relationship grouper 128 addresses this issue by defining the relationships amongst the non-native wrapper objects of the non-native heap 104A as they correspond to the native objects of the native heap 104B The relationship grouper 128 may use the tracking fields of the wrapper objects to define or otherwise identify relationships amongst the wrapper objects of the heap 104A as they correspond to the (relationships amongst) native objects of the heap 104B. As referenced above, tracking fields may include a field of the wrapper objects (which have already been allocated) used to identify relationships and/or object groupings amongst the wrapper objects. For example, if native object A has a relationship with native objects B and C, the relationship grouper 128 may use the tracking field of wrapper object A to point to wrapper object B, use the tracking field of wrapper object B to point to wrapper object C, and use the tracking field of wrapper object C to point to wrapper object A. As such, the relationship grouper 128 may create one or more circular linked lists amongst the non-native wrapper objects of the heap 104A using the pre-allocated and/or otherwise pre-defined tracking fields. Each linked list, circular or not, as defined by the relationship grouper 128, may be an object grouping. The relationship grouper 128 may provide or define a value in the tracking field that references or otherwise groups a wrapper object with other non-native (wrapper and/or non-wrapper) objects. This value(s) may, in an example embodiment, not take up any more memory space than was originally allocated to the tracking field.

Though a tracking field may be defined with the instantiation or creation of the wrapper objects in the system 100, in other example embodiments, the tracking field may be created at other times as well. Tracking fields may be added or otherwise associated with the wrapper objects at any point before garbage collection and/or the available or remaining memory (from memory 104) crosses below a threshold. For example, the heap 104A may have a first threshold at which (tracking) fields or other data-objects are created to represent the interconnectivity/relationships of the native objects amongst the wrapper objects at any point during garbage collection. Then for example, the heap 104A may have a second threshold at which garbage collection is performed. Though a tracking field is referred to herein as being used to represent the relationships amongst the wrapper objects, as just referenced, other example embodiments may include other data-objects, other than a field to represent the interconnectivity and/or relationships of the native objects.

After the relationship grouper 128 has grouped the non-native wrapper objects into one or more groupings (based on the relationships/interconnectivity amongst the corresponding native objects), a usage detector 130 may determine object usage amongst the non-native (including wrapper and non-wrapper) objects of the heap 104A. The usage detector 130 may determine which objects of the non-native heap 104A are being used and/or are unused. For example, the usage detector 130 may determine which object(s) of the heap 104A are no longer and/or can no longer be referenced by and/or make reference to other objects of the heap 104A. These objects that may be determined to have no reference to and/or from other objects may be deemed unused objects.

For example, if heap 104A includes wrapper objects A-E that have relationships as provided by the relationship grouper 128, whereby only object A calls object B which is the only object that calls objects C, D and E, and if there is no other object in heap 104A that calls, references and/or otherwise uses object A, then object A may be considered unused by the usage detector 130. And then, based on the relationships between the objects, all the other objects (B-E) belonging to the same grouping as object A may be considered unused objects as well.

A non-native garbage collector 132 may de-allocate the unused objects from heap 104A. Non-native garbage collector 132 may de-allocate or otherwise free up that portion of memory 104 (e.g., specifically in non-native heap 104A) that was being used or otherwise reserved for the unused objects. Non-native garbage collector 132 may determine whether or not to remove all the non-native objects belonging to a grouping, such that if one of the objects of the grouping is determined to be unused, then all the objects of the grouping are unused, and likewise, if one member of a grouping is being used, then none of the members of the grouping may be de-allocated by the non-native garbage collector 132 because the usage detector 130 may determine that all of the objects of the grouping are being used.

The system 100 may allow a non-native garbage collector to efficiently collect all the garbage (e.g., unused objects) stored in a non-native heap, including those objects that are references, wrappers, pointers and/or other proxies to objects stored in one or more native heaps. By pre-allocating space in a tracking field of the wrapper objects, the system 100 traverses the native heaps and provides the interconnectivity/relationships amongst the native objects to the non-native heap using the tracking field, which results in one or more object groupings. Because the tracking fields are pre-allocated in the respective non-native objects, there is no additional consumption of memory for tracking purposes or object groupings at the time of garbage collection. Then the non-native garbage collector, using the object groupings, can efficiently determine which object groupings are being unused, de-allocate all of the objects of the unused groupings and free up memory space in the heap for continued program execution.

The system 100 may be implemented using conventional or legacy non-native garbage collectors in existing schemes. The system 100 does not require any modification to the conventional garbage collectors. As part of their existing process, the conventional garbage collectors will recognize the groupings as defined in the system 100 and described above. As such, implementing the system 100 into conventional schemes with legacy garbage collectors will allow the legacy garbage collectors to account for and free memory that may be otherwise allocated to unused wrapper objects and that may create memory leaks and system crashes.

Figure 2:
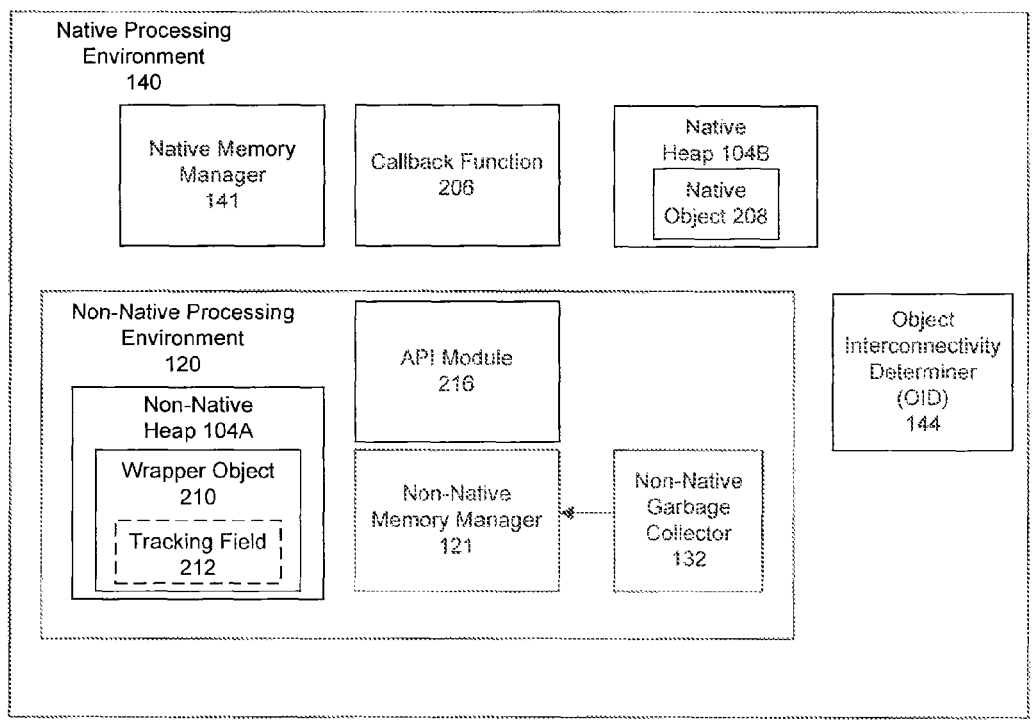
FIG. 2 illustrates an example embodiment of the system of FIG. 1.

FIG. 2 illustrates an embodiment of the system 100 of FIG. 1. Like-numbered elements of FIG. 2 may substantially correspond to the like-numbered elements of FIG. 1. In the system 200 it may be seen that the non-native processing environment (PE) 120 may be embedded in or otherwise comprise a portion of the native PE 140. In an example embodiment, the non-native PE 120 may include a Java PE that is embedded in the native PE 140, which may include another browser functional language, such as C. For example, the system 200 may be used to enhance functionality associated with a browser.

The non-native PE 120 may include an application programming interface (API) module 216 that may be used by the non-native memory manager (MM) 121 to communicate with native memory manager 141, for example, to be informed about the used and/or unused status of native objects. As shown, the non-native wrapper object 210 may include a tracking field 212. The API module 216 may include a particular set of rules and/or specifications that a program (150) can follow for make use of another program (150) that implements the API. The API module 216 may serve as an interface between the non-native PE 120 and the native PE 140. The non-native MM 121 may use the API module 216 to generate the wrapper object(s) 210, or, for example, the API module 216 may be used to define or may otherwise define the wrapper object 210, which may then be instantiated by the non-native MM 121.

Prior to garbage collecting non-native heap 104A, as discussed above, OID 144 may determine relationships amongst one or more native objects 208 that exist on native heap 104B. After the relationship information for the native objects 208 has been determined, the information and control may be passed back to the non-native PE 120 via a callback function 206. The non-native memory manager 121 may then provide values to the tracking field(s) 212 to group the wrapper objects 210 of the non-native heap 104A based on the relationships among the corresponding native object(s) 208. The garbage collector 132 may then garbage collect the non-native heap 104A and remove unused objects.

Though not specifically shown, it may be understood that the native PE 140 may include its own object grouping and garbage collection system (e.g., 100) as described above. In the native PE's 140 system, the native PE 140 may be considered non-native and the non-native PE 120 may be considered native. Then, the garbage collection system may effectively clear all the unused objects from the native heap 104B. In other embodiments, the native PE 140 may be embedded within a third PE (e.g., another non-native or native PE, not shown) and one or more object grouping garbage collection systems may operate on two or more of the PEs.

Figure 3A:
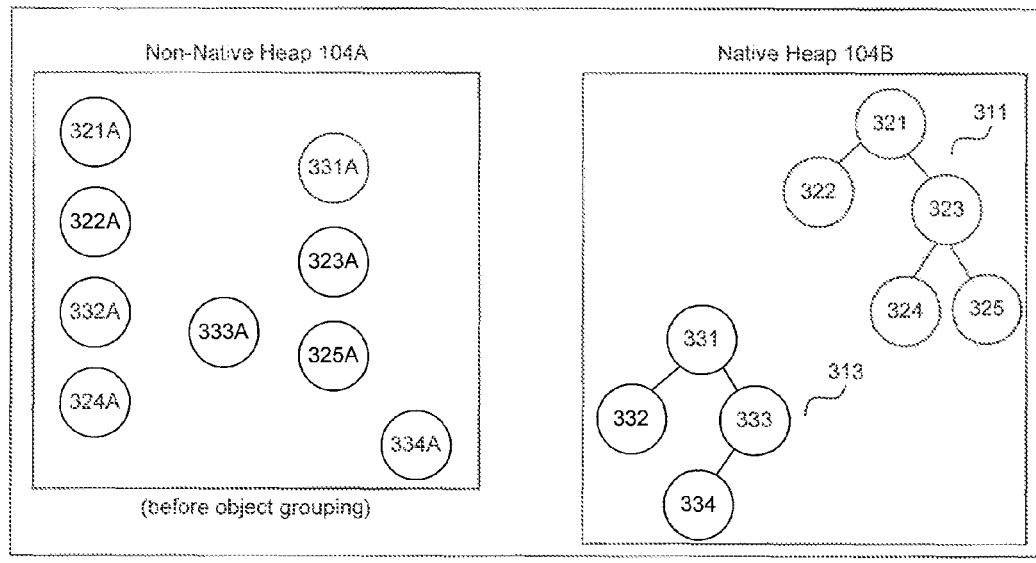
FIG. 3A is an example illustration of a non-native heap and a corresponding native heap prior to object grouping.
Figure 3B:
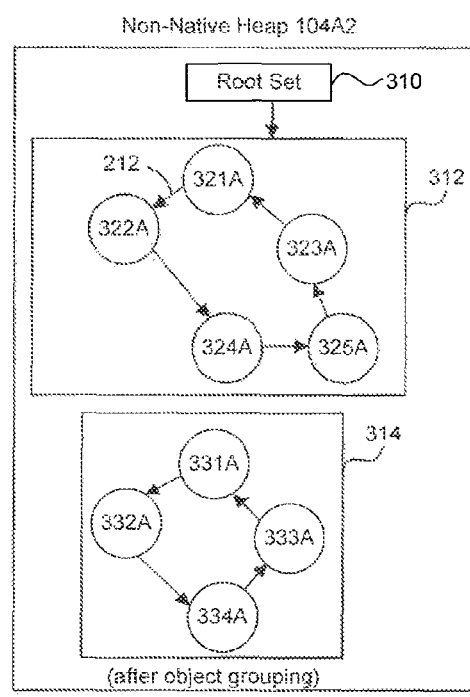
FIG. 3B is an example illustration of the non-native heap of FIG. 3A after object grouping.

FIG. 3A is an example illustration of a non-native heap 104A and a corresponding native heap 104B prior to object grouping. FIG. 3B is an example illustration of the non-native heap 104A of FIG. 3A after object grouping.

As shown in FIG. 3A, the non-native heap 104A may include a number of non-native wrapper objects, 321A, 322A, 323A, 324A, 325A, 331A, 332A, 333A and 334A that correspond to one or more native wrapper objects in the native heap 104B, whereby like numbered objects between the heaps may correspond. For example, the wrapper object 321A may correspond, reference or otherwise point to the native object 321. Though the example of FIG. 3A shows a one-to-one correspondence between the objects of the heaps 104A, 104B, other embodiments may include other correspondences such as one-to-many and/or many-to-one. Also, though only wrapper and native objects are shown, the heaps 104A, 104B other objects and/or data as well (not shown).

The native heap may include the native objects organized into two interconnected or logical trees 311, 313. The trees 311 and 313 are exemplary only. As shown the tree 311 may include a parent node 321 connected to children nodes 322 and 323, by which child node 323 is the parent of nodes 324 and 325. Even though, for example, the nodes 325 and 322 may exist on different branches of the tree 311, the OID 144 and/or the relationship grouper 128 may recognize that the nodes may still communicate with one another through parent-child relationships in the tree 311 and thus may be grouped together as shown in the corresponding object grouping 312 in FIG. 3B.

The non-native heap 104A2 of FIG. 3B may include a representation of the non-native heap 104A of FIG. 3A after object grouping. The trees 311 and 313 may be represented by the object groupings 312 and 314, respectively. The object groupings may be defined by the values provided by the tracking fields 212 that did not exist in the pre-grouping heap 104a. The tracking fields in the example groupings 312, 314 may correspond to circular linked lists. Then, for example, when a garbage collector (132) parses the non-native heap 104A2 after grouping, the garbage collector will know that either all of the nodes of an object grouping 312 or 314 are to be garbage collected or none of them. Because if even a single node of the groupings 312, 314 is being used, then it is possible that any of the nodes or objects of the grouping may be used and should not be garbage collected. But by garbage collecting all the nodes of a grouping that are unused, the garbage collector may prevent memory leaks from occurring in the non-native heap 104B due to unused objects remaining in memory (104).

The non-native heap 104A2 may include a root set 310. The root set 310 may include the object(s) of the heap 104A2 that are considered reachable or in use by a program (150). As may be seen in the example of 104A2, the object grouping 312 may include a connection or reference from the root set 110, which may indicate that the object grouping 312 is being used or is reachable and should not be garbage collected. The object group 314, by contrast, does not include a reference to/from any other root set or reachable object. As such, all the objects of the group 314 may be considered unused and should be garbage collected on the next iteration of the a non-native garbage collector (132).

Figure 4:
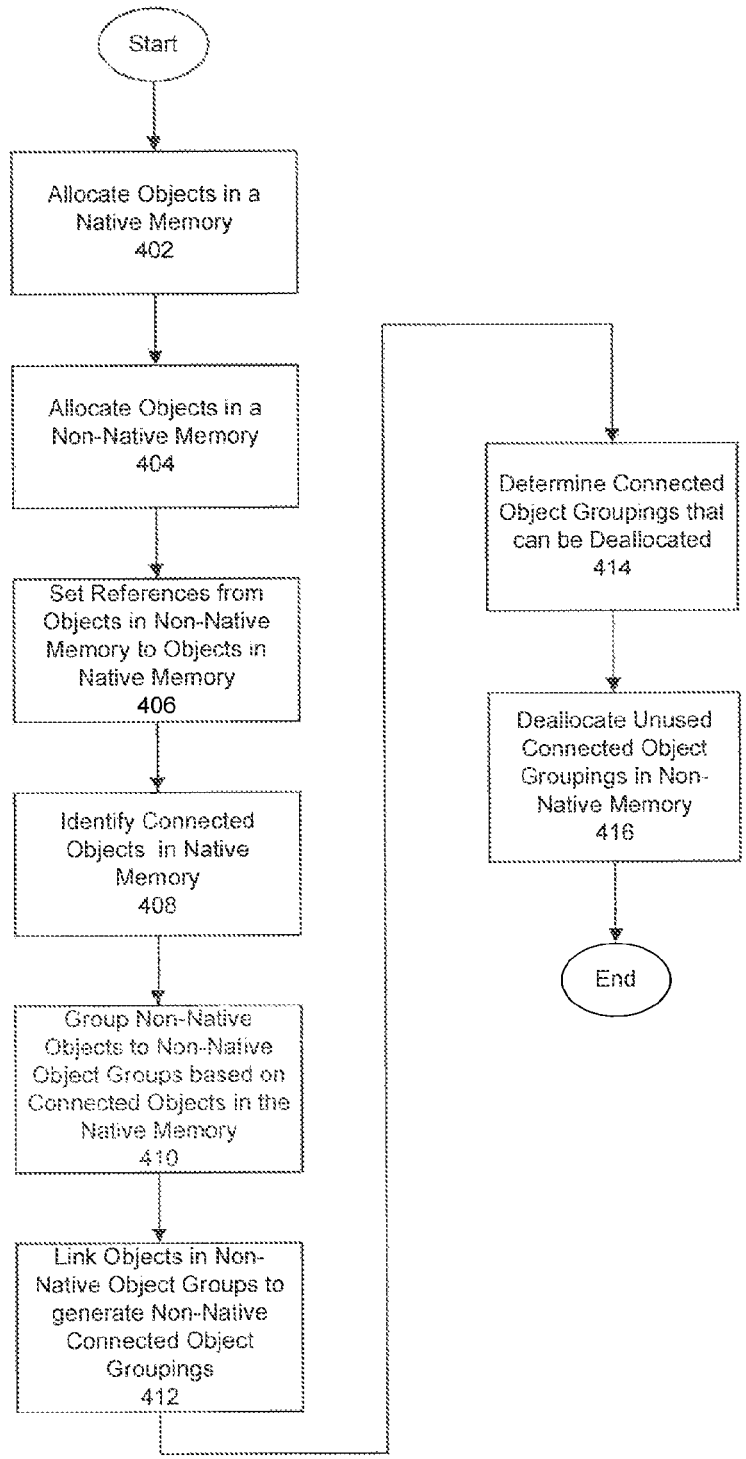
FIG. 4 illustrates a method for garbage collecting by object grouping.

FIG. 4 illustrates a method 400 for object grouping for garbage collection. After a start step, at step 402, objects may be allocated in a native memory. In reference to FIGS. 1-3B, a native object 208 may be allocated in the native heap 104B. The native object allocation may be the result of one or more instructions operating on one or more programs 150.

At step 404, objects may be allocated in a non-native memory. For example, a wrapper object 210 may be allocated in the non-native memory 104A. The wrapper object 210 may include a tracking field 212 that may be allocated at the same time that the wrapper object 210 is created. The tracking field 212 may or may not have a valid value or reference at this time, and may be initialized to a default value.

At step 406, references may be set from objects on the non-native memory to objects on the native memory. For example, a wrapper object 321A may correspond and/or otherwise be created as a response to the creation of a native object 321. The wrapper object 321A may include a reference, pointer or other correspondence information that indicates that the wrapper object 321A references the native object 321.

At step 408, connected objects may be identified in the native memory. For example, the OID 144 may determine the interconnectivity of the native objects 321 . . . 334 of the native heap 104B. The interconnectivity may include any connectivity, calls, references or other relationships between and/or amongst the native objects 321 . . . 324 and/or one or more other objects.

At step 410, non-native objects may be grouped into non-native object groups based on connected objects in the native memory. For example, as shown in FIG. 3B, the non-native heap 104B, after object grouping, may include the object groupings 312 and 314. The object groupings, at this point, as determined by the relationship grouper 128, may not include the values of the tracking field 212 may be filled in later. Or for example, the tracking fields 212 may be provided a preliminary or grouping value to indicate which of the non-native objects belong to the same group. The non-native wrapper objects 331A, 332A, 333A and 334A may be grouped based on the connected objects of the tree 313. In other embodiments, the tracking field 212 values may be provided prior to and/or simultaneously with object grouping.

At step 412, non-native object groups may be linked to generate non-native connected object groupings. For example, as shown in the heap 104B of FIG. 3B, the values of the tracking fields 212 may be provided (e.g., by the relationship grouper 128) to create or represent the connections between the non-native wrapper objects of the groupings 312 and 314. The connections as shown by tracking field 212 in FIG. 3B, may not actually exist within the non-native heap 104A2, but rather may be inferred from the values provided to the tracking fields 212.

At step 414, the object groupings to be de-allocated may be determined. For example, the usage detector 130 may determine which non-native objects of the non-native heap 104A may be used and/or unused. An unused object may include an object to which there are no known and/or otherwise detected references to and/or from that object to one or more objects of the same and/or different heaps 104A, 104B or other memory 104 portions. The usage detector 130 may determine whether all or none of the non-native objects of the object groupings 312, 314 are being unused and as such may be de-allocated. If, however, even a single object of one of the object groupings 312, 314 may be accessed and/or called by an object outside the grouping (e.g., being used) then all of the objects of the grouping 312, 314 may be used and are not ready for de-allocation.

At step 416, the unused connected object groupings of the non-native memory may be de-allocated. For example, the garbage collector 132 may de-allocate or otherwise free up any of the memory 104 being used or otherwise allocated in the unused objects of the non-native heap 104A. The garbage collector 132 may, for example, remove the unused (wrapper and non-wrapper) objects including all the objects of whatever object grouping 312, 314 to which they belong. At an end step, the process 400 may complete.

Figure 5:
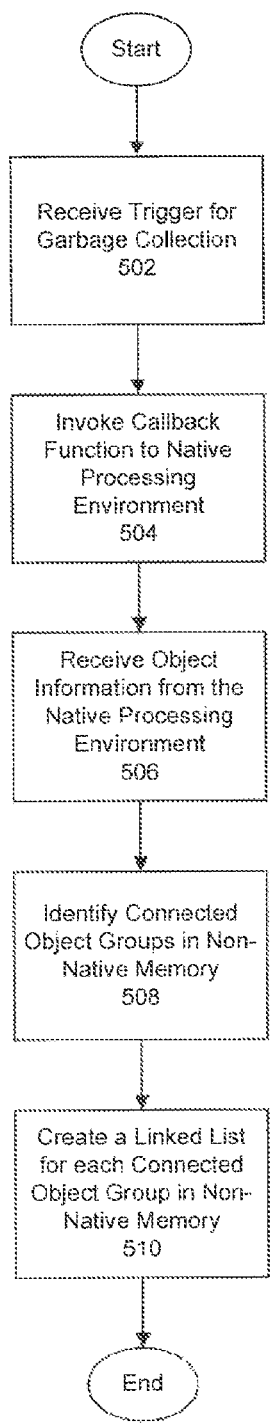
FIG. 5 illustrates a method for forming object groups for garbage collection.

FIG. 5 illustrates a method 500 of forming object groups for garbage collection. After a start step, at step 502, a trigger may be received for garbage collection. In reference to FIGS. 1-3B, the non-native memory manager 121 may receive an indication from or otherwise determine that the non-native heap 104A has reached and/or is approaching a storage threshold. Then, for example, this determination may trigger object grouping for the heap 104A. The object grouping trigger may result in an execution of the OID 144 to determine the relationships of native objects in the native processing environment 140.

At step 504, a callback function may be invoked to the native processing environment. For example, the OID 144 of the native PE 140 may determine the relationships amongst the native objects of the heap 104B. Then upon this completion, the callback function 206 may be invoked that may return the object grouping for garbage collection process back to the non-native processing environment 120.

At step 506, object information may be received from the native processing environment. For example, the non-native MM 121 may receive the relationship information (as determined by the OID 144) from the native PE 140. The non-native MM 121 may provide this information to the relationship grouper 128.

At step 508, the connected object groups may be identified in the non-native memory. For example, the relationship grouper 128 may group the objects of the non-native memory 104A into the object groupings 312 and 314 based on the relationships between the native objects as shown in trees 311 and 313.

At step 510, a linked list may be created for each connected object group in the non-native memory. For example, the relationship grouper 128 may provide values that create relationships between the objects of the non-native heap 104A. As shown, particularly in FIG. 3B, the tracking fields 212 may be inserted and/or created or otherwise defined between the non-native wrapper objects to create the connected object groupings 312, 314 as shown. The linked list may include a circular linked list where the last element of the list points back to the first element of the list.

Figure 6:
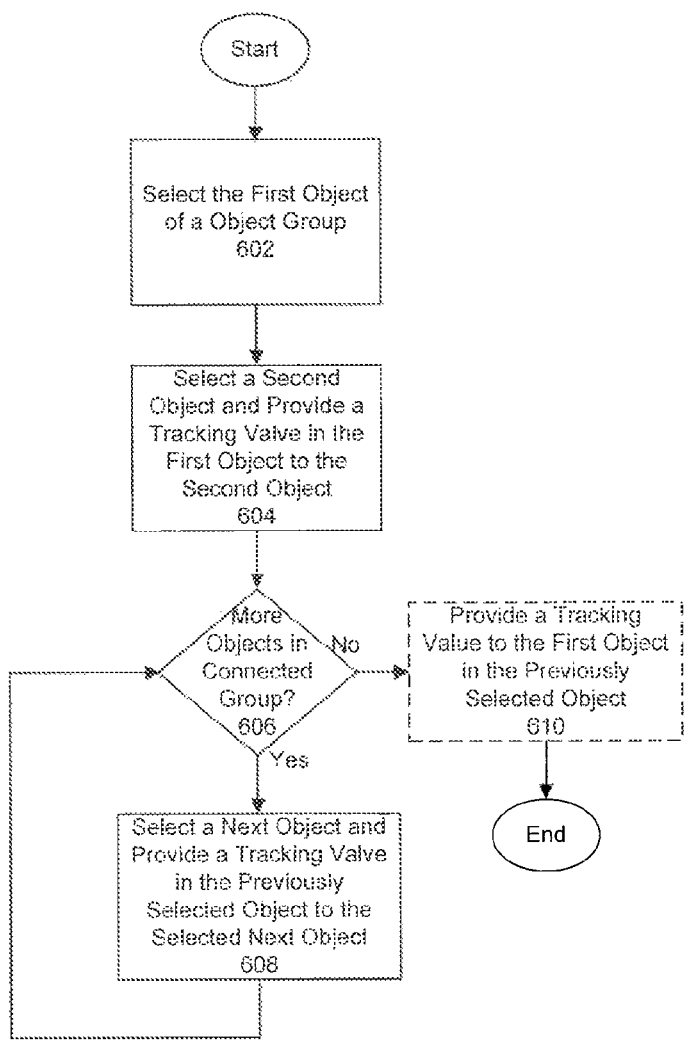
FIG. 6 illustrates a method for forming linked lists representing object groups for garbage collection.

FIG. 6 illustrates a method 600 for forming linked lists representing object groups for garbage collection. After a start step, at step 602, a first object of an object group may be selected. For example, in the non-native heap 104A of FIG. 3A, the object 321A may be selected.

At step 604, a second object may be selected and a tracking value may be provided in the first object to the second object. For example, the object 322A may be selected from the heap 104A. Then, for example, the relationship grouper 128 may provide a tracking value in tracking field 212 to create a reference or relationship between the objects 321A and 322A.

At step 606, it may be determined whether there are more objects in the connected group. For example, the relationship grouper 128 may determine that the objects 324A 325A, and 323A of the group 312 still remain and have not been connected. Then, for example, the process 600 may move down the 'Yes' branch to step 608.

At step 608, a next object may be selected and a tracking value may be provided in the previously selected object to the selected next object. For example, the relationship grouper 128 may select the object 324A, and provide a tracking value linking or associating the object 322A to object 324A. Then the process 600 may continue to step 606 to repeat the process for the remaining objects of the group (e.g., 325A and 323A).

When all the objects of the group have been interconnected to at least one other object of the group, the process 600 may proceed from step 606 to step 610. At step 610, another tracking value may be provided that links the last object of the group (e.g., object 323A) to the first object of the group (e.g., object 321A). Step 610, is optional, but may be used to create a circular linked list of the connected object groupings 312, 314. The circular linked list may include a reference from the last item(s) of the list to the first item(s) of the list or object grouping, as shown in groupings 312 and 314. The process 600 ends.

Figure 7:
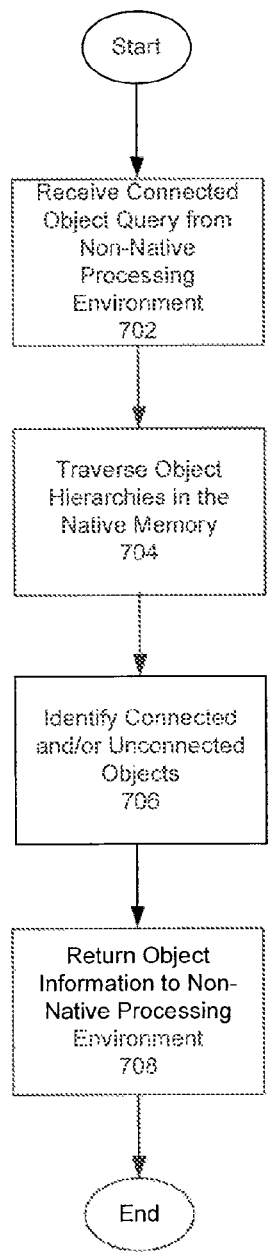
FIG. 7 illustrates a method for obtaining object reachability information from a native processing environment.

FIG. 7 illustrates a method 700 for obtaining object reachability information from a native processing environment. After a start step, at step 702, a connected object query may be received from a non-native processing environment. In reference to FIGS. 1-3B, prior to the garbage collector 132 garbage collecting the non-native heap 104A, the non-native MM 121 may query or provide a query to the native PE 141. The query may be received by the native MM 141 and be provided to (and/or otherwise is received directly by) the OID 144.

At step 704, object hierarchies of the native memory may be traversed. For example, the OID 144 may traverse the hierarchies of the trees 311 and 313 in the native heap 104B.

Though the trees 311, 313 are shown as having a top-down hierarchical nature, in other embodiments the trees 311, 313 may be flat, singular, circular and/or may embody other hierarchies as well, including but not limited to top-down.

At step 706, connected and/or unconnected objects may be identified. For example, the OID 144 may determine which objects of the trees 311, 313 are connected to other objects and/or how they are connected.

At step 708, object information may be returned to a non-native processing environment. For example, the callback function 206 may be executed or called and the object information (as collected/determined by the OID 144) may be provided to the non-native PE 120. The process 700 ends.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of managing a memory using at least one processor configured to access a non-native memory and a native memory, the method comprising:

allocating a plurality of non-native objects in the non-native memory by one or more processes in a non-native processing environment, wherein each of the non-native objects correspond to respective native objects of a plurality of native objects allocated in the native memory by one or more processes in the native processing environment, wherein the non-native memory is a portion of the memory accessible from the non-native processing environment, and wherein the native memory is another portion of the memory accessible from the native processing environment and not accessible from the non-native processing environment;

generating non-native object groups within the plurality of non-native objects based upon connectivity relationships between native objects in the plurality of native objects;

providing, in respective non-native objects of the generated non-native object groups, one or more references to other non-native objects of the generated non-native object groups, wherein the references provide, to corresponding non-native objects, a traversal of the connectivity relationships between the native objects, and wherein the providing further comprises: allocating, in the non-native objects, a tracking field;

linking non-native objects in the non-native object groups based on the provided references to generate non-native connected object groups, wherein the linking comprises: forming, for each of the non-native objects in the non-native object group, a circular linked list inter-connecting each non-native object, by providing one or more values into the tracking field of each non-native object;

detecting at least one unused non-native connected object group; and de-allocating objects of the detected at least one unused non-native connected object group.

2. A method of managing a memory using at least one processor configured to access a native memory and a non-native memory, comprising:

allocating a plurality of native objects in the native memory by one or more processes in a native processing environment;

allocating a plurality of non-native objects in the non-native memory by one or more processes in a non-native processing environment, wherein each of the non-native objects corresponds to native objects of the plurality of native objects, wherein the non-native memory is a portion of the memory accessible from the non-native processing environment, and wherein the native memory is another portion of the memory accessible from the native processing environment and not accessible from the non-native processing environment;

identifying one or more native connected object groups from the plurality of native objects;

generating non-native object groups with the plurality of non-native objects based upon connectivity relationships between the one or more native connected object groups;

providing, in respective non-native objects of the generated non-native object groups, one or more references to other non-native objects of the generated non-native object groups, wherein the references provide, to corresponding non-native objects, a traversal of connectivity relationships between the native objects, and wherein the providing further comprises: allocating, in the non-native objects, a tracking field;

linking non-native objects in the non-native object groups based on the provided references to generate non-native connected object groups, wherein the linking comprises: forming, for each of the non-native objects in the non-native object group, a circular linked list inter-connecting each non-native object, by providing one or more values into the tracking field of each non-native object;

detecting at least one unused non-native connected object group; and de-allocating objects of the detected at least one unused non-native connected object group.

3. The method of claim 2, wherein the linking comprises:

associating a respective tracking value from each of the respective non-native objects of the generated non-native object groups to exactly one of the other non-native objects of the generated non-native object groups.

4. The method of claim 2, wherein the providing comprises:

allocating a tracking field associated with each of the plurality of allocated non-native objects; and inserting a tracking value into the tracking field, wherein the tracking value provides the one or more references to other non-native objects of the one or more non-native object groups to create one or more connected object groups.

5. The method of claim 2, wherein identifying the one or more native connected object groups comprises:

traversing a respective tree data structure from each of the one or more native connected object groups.

6. The method of claim 5, wherein identifying the one or more native connected object groups further comprises:

signaling, from the non-native processing environment to the native processing environment, to start the traversing.

7. The method of claim 6, wherein the signaling uses a callback interface between the native and the non-native processing environments.

8. The method of claim 2, wherein the native memory and the non-native memory comprise respective heap data structures.

9. The method of claim 2, wherein detecting at least one unused non-native connected object group comprises:

determining that the at least one non-native connected object group cannot be reached from a root node.

10. The method of claim 2, wherein one or more of the non-native objects are wrapper objects for one or more of the native objects.

11. The method of claim 2, wherein the non-native processing environment is embedded in the native processing environment.

12. The method of claim 2, wherein the native processing environment and the non-native processing environment are embedded in a third processing environment.

13. A system for managing memory usage in a computer, comprising:

at least one processor configured to implement a native processing environment and a non-native processing environment;

at least one volatile memory including a native memory accessible from the native processing environment and not accessible from the non-native processing environment, and a non-native memory accessible from the non-native processing environment;

a native memory allocator configured to allocate a plurality of native objects in the native memory;

a non-native memory allocator configured to allocate a plurality of non-native objects in the non-native memory, wherein each of the non-native objects corresponds to a respective one of the native objects;

a relationship grouper configured to:

generate non-native object groups with the plurality of non-native objects based upon connectivity relationships between the one or more native connected object groups;

provide, in respective non-native objects of the generated non-native object groups, one or more references to other non-native objects of the generated non-native object groups, wherein the references provide, to corresponding non-native objects, a traversal of connectivity relationships between the native objects, and wherein to provide comprises the relationship grouper further configured to allocate, in the non-native objects, a tracking field; and link non-native objects in the non-native object groups based on the provided references to generate non-native connected object groups, wherein to link comprises the relationship grouper further configured to form, for each of the non-native objects in the non-native object group, a circular linked list inter-connecting each non-native object, by providing one or more values into the tracking field of each non-native object;

an usage detector configured to detect at least one unused non-native connected object group; and a garbage collector configured to de-allocate objects of the detected at least one unused non-native connected object group.

14. The system of claim 13, wherein the relationship grouper is further configured to:

receive, in the non-native processing environment, information related to the one or more native connected groups.

15. The system of claim 13, wherein one or more of the non-native objects are wrapper objects for one or more of the native objects.

16. The system of claim 13, wherein the non-native processing environment is embedded in the native processing environment, and wherein the non-native processing environment communicates with the native processing environment using an application programming interface (API).

17. A computer readable storage medium having computer program logic recorded thereon, that, when executed by at least one processor implementing a native processing environment including a native memory and a non-native processing environment including a non-native memory, cause the at least one processors to perform operations for managing a memory comprising:

allocating a plurality of non-native objects in the non-native memory, wherein each of the non-native objects corresponds to respective native objects of a plurality of native objects allocated in the native memory, wherein the non-native memory is a portion of the memory accessible from the non-native processing environment, and wherein the native memory is another portion of the memory accessible from the native processing environment and not accessible from the non-native processing environment;

generating non-native object groups within the plurality of non-native objects based upon connectivity relationships between the one or more native connected object groups;

providing, in respective non-native objects of the generated non-native object groups, one or more references to other non-native objects of the generated non-native object groups, wherein the references provide, to corresponding non-native objects, a traversal of connectivity relationships between the native objects, and wherein the providing further comprises: allocating, in the non-native objects, a tracking field;

linking non-native objects in the non-native object groups based on the provided references to generate non-native connected object groups, wherein the linking comprises: forming, for each of the non-native objects in the non-native object group, a circular linked list inter-connecting each non-native object, by providing one or more values into the tracking field of each non-native object;

detecting at least one unused non-native connected object group; and de-allocating objects of the detected at least one unused non-native connected object group.

* * * * *

UNITED STATES PATENT AND TRADEMARK OFFICE
CERTIFICATE OF CORRECTION

| | | |
|---|---|---|
| PATENT NO. | : 8,856,186 B1 | Page 1 of 1 |
| APPLICATION NO. | : 13/172712 | |
| DATED | : October 7, 2014 | |
| INVENTOR(S) | : Li et al. | |

It is certified that error appears in the above-identified patent and that said Letters Patent is hereby corrected as shown below:

On the Title page, item 57, please replace "Normative objects" with --Non-native objects--.

Signed and Sealed this
Fifth Day of May, 2015

Michelle K. Lee
*Director of the United States Patent and Trademark Office*